United States Patent
Li et al.

(10) Patent No.: US 12,487,374 B2
(45) Date of Patent: Dec. 2, 2025

(54) METHOD AND SYSTEM FOR STABILIZING POYNTING VECTOR OF SEISMIC WAVEFIELD

(71) Applicant: Institute of Geology and Geophysics, Chinese Academy of Sciences, Beijing (CN)

(72) Inventors: Zhiyuan Li, Beijing (CN); Guanghe Liang, Beijing (CN)

(*) Notice: Subject to any disclaimer, the term of this patent is extended or adjusted under 35 U.S.C. 154(b) by 849 days.

(21) Appl. No.: 17/725,971

(22) Filed: Apr. 21, 2022

(65) Prior Publication Data

US 2022/0350043 A1    Nov. 3, 2022

(30) Foreign Application Priority Data

Apr. 22, 2021   (CN) .......................... 202110436362.5

(51) Int. Cl.
  *G01V 1/36*    (2006.01)
  *G01V 1/28*    (2006.01)
  *G01V 1/30*    (2006.01)

(52) U.S. Cl.
  CPC .............. *G01V 1/366* (2013.01); *G01V 1/282* (2013.01); *G01V 1/307* (2013.01)

(58) Field of Classification Search
  CPC .... G01V 1/282; G01V 2210/51; G01V 1/307; G01V 1/301; G01V 2210/32; G01V 2210/66; G01V 2210/67; G01V 2210/679
  See application file for complete search history.

(56) References Cited

PUBLICATIONS

Yan, Zhe, and Xiao-Bi Xie. "Full-wave seismic illumination and resolution analyses: A Poynting-vector-based method." Geophysics 81.6 (2016): S447-S458. (Year: 2016).*

Yan, Jia, and Thomas A. Dickens. "Reverse time migration angle gathers using Poynting vectors." Geophysics 81.6 (2016): S511-S522. (Year: 2016).*

* cited by examiner

*Primary Examiner* — Raphael Schwartz
(74) *Attorney, Agent, or Firm* — Mark C. Johnson; Johnson Dalal

(57) ABSTRACT

The present disclosure provides a method and system for stabilizing a Poynting vector of a seismic wavefield. The method includes: adjusting an amplitude of a time derivative of the seismic wavefield, and computing a Poynting vector of the adjusted time derivative of the seismic wavefield to obtain a first Poynting vector, where a difference between the amplitude of the first Poynting vector and the amplitude of a second Poynting vector is within a set range, and the second Poynting vector belongs to the seismic wavefield; and conducting operation on the second Poynting vector and the first Poynting vector to obtain a final Poynting vector of the seismic wavefield. The present disclosure addresses instability of Poynting vectors computation.

9 Claims, 10 Drawing Sheets

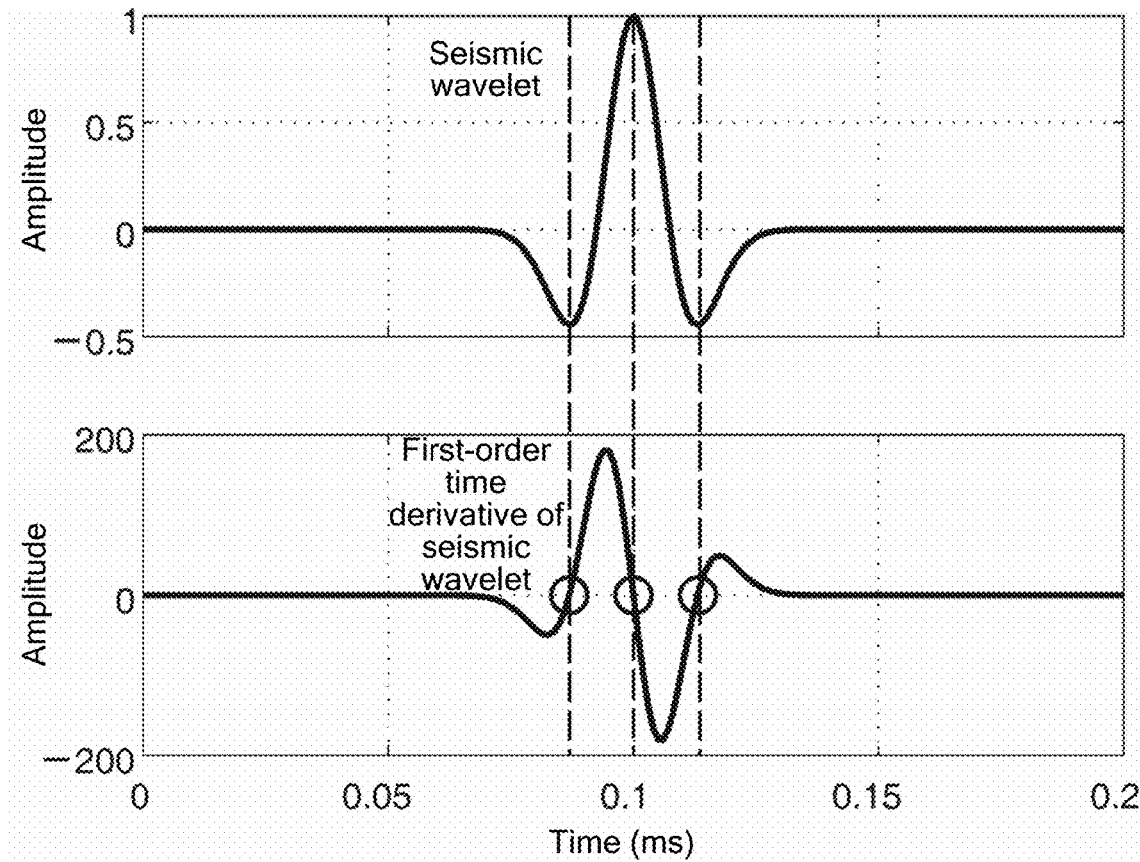

Adjust an amplitude of a time derivative of a seismic wavefield, and compute a Poynting vector of the adjusted time derivative of the seismic wavefield to obtain a first Poynting vector; where a difference between the amplitude of the first Poynting vector and the amplitude of a second Poynting vector is within a set range, and the second Poynting vector belongs to the seismic wavefield

↓        102

Conduct operation on the second Poynting vector and the first Poynting vector to obtain a final Poynting vector of the seismic wavefield

FIG. 2

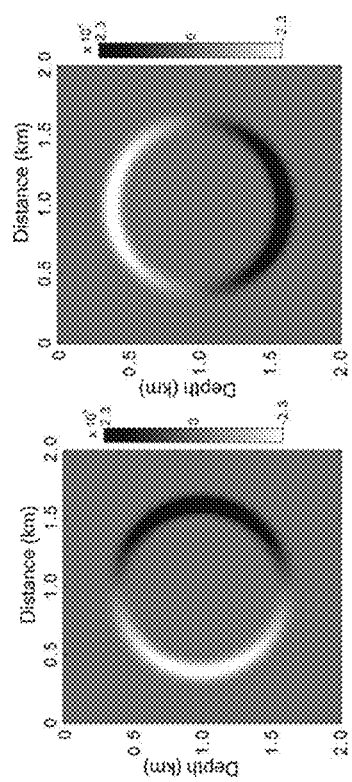
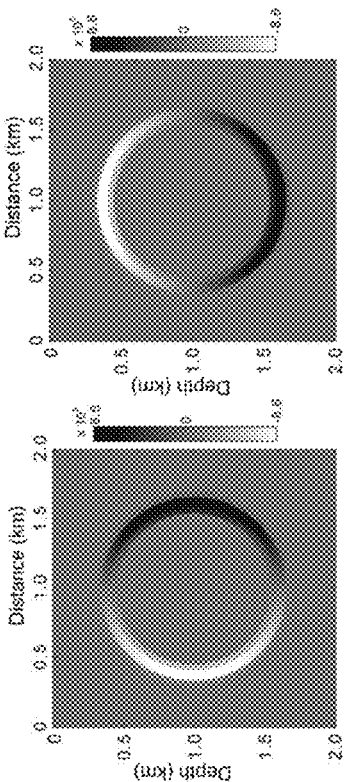
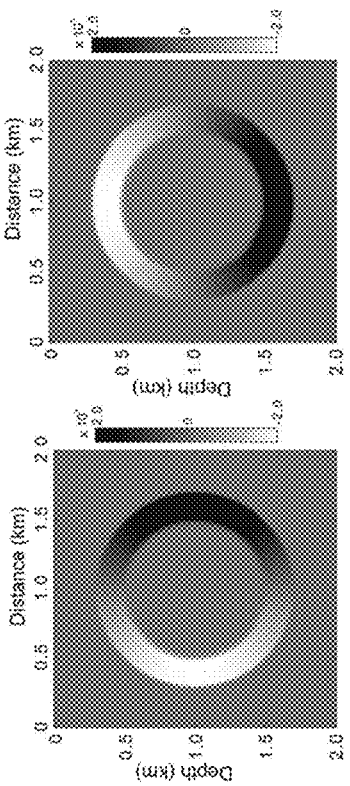

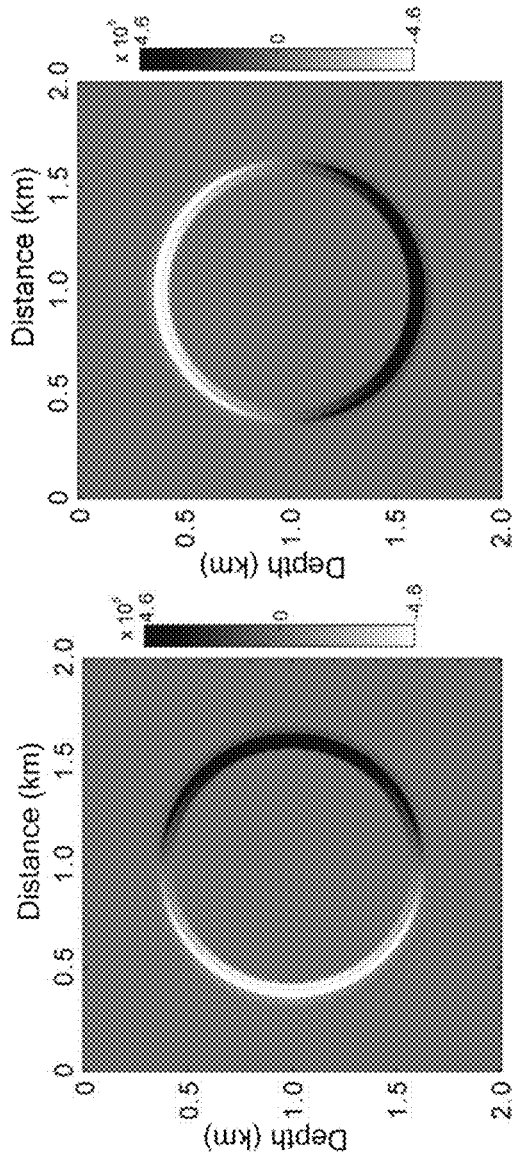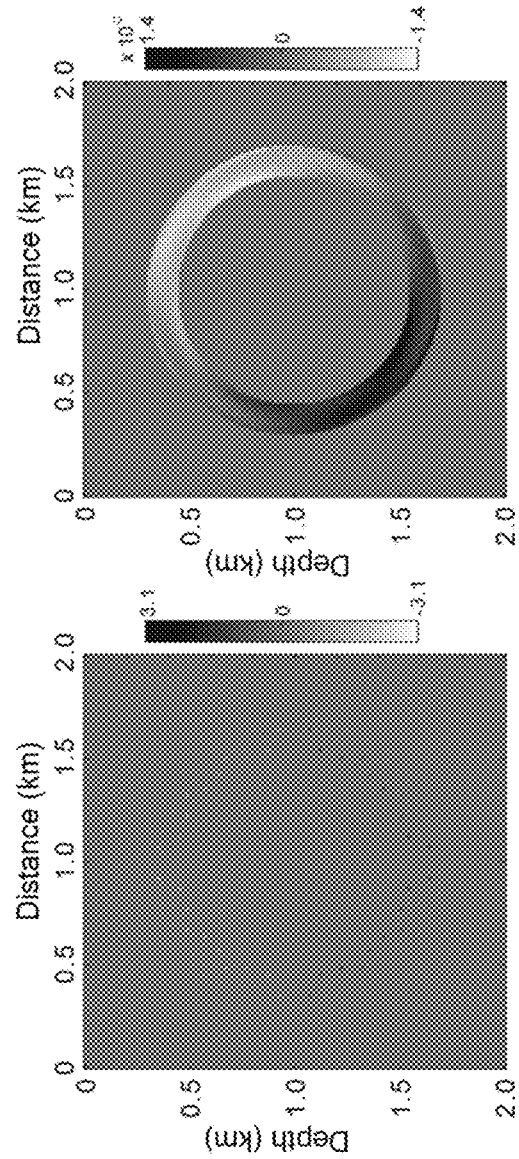
FIG. 5(i)    FIG. 5(j)    FIG. 6(a)    FIG. 6(b)

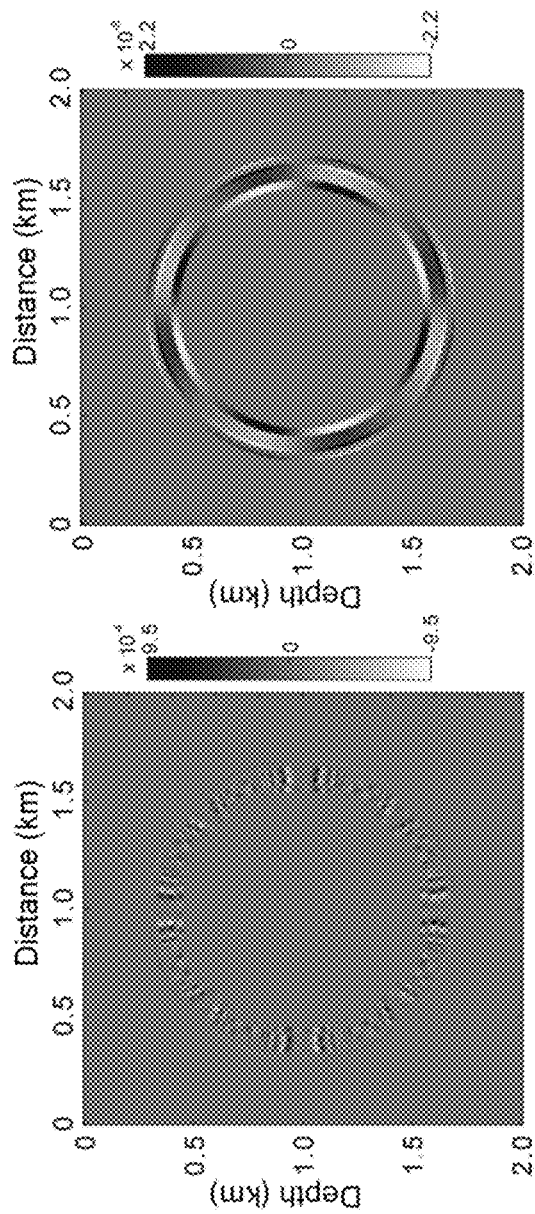
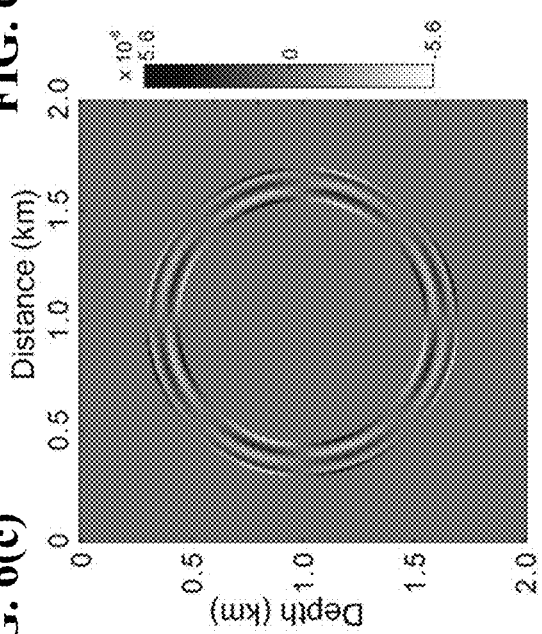
FIG. 6(c)
FIG. 6(d)
FIG. 6(e)

METHOD AND SYSTEM FOR STABILIZING POYNTING VECTOR OF SEISMIC WAVEFIELD

CROSS REFERENCE TO RELATED APPLICATION

This patent application claims the benefit and priority of Chinese Patent Application No. 202110436362.5, filed on Apr. 22, 2021, the disclosure of which is incorporated by reference herein in its entirety as part of the present application.

TECHNICAL FIELD

The present disclosure relates to the field of seismic exploration, and in particular to a method and system for stabilizing a Poynting vector of a seismic wavefield.

BACKGROUND ART

Poynting vector is in line with propagation vector of a seismic wavefield in direction, and has been widely used in the field of seismic exploration due to its high computational efficiency.

However, Poynting vector computation has the drawback of instability. This is because Poynting vector requires computation of space and time derivatives of a seismic wavefield, and derivative values at the peak and trough of a seismic wavelet in the seismic wavefield are zero, making the propagation direction at these points hardly accessible to the Poynting vector. With reference to a seismic wavelet and its first-order time derivative as shown in FIG. 1, the positions marked by the circle in FIG. 1 are the positions at which instability of Poynting vector computation occurs, which will affect the subsequent data processing, such as reduction in the extraction quality of angle-domain common-image gathers (ADCIGs).

SUMMARY

In view of this problem, it is necessary to provide a method and system for stabilizing a Poynting vector of a seismic wavefield, so as to address the instability of Poynting vector computation.

In order to achieve the above objective, the present disclosure provides the following technical solutions:

A method for stabilizing a Poynting vector of a seismic wavefield, including:
  adjusting an amplitude of a time derivative of the seismic wavefield, and computing a Poynting vector of the adjusted time derivative of the seismic wavefield to obtain a first Poynting vector, where a difference between the amplitude of the first Poynting vector and the amplitude of a second Poynting vector is within a set range, and the second Poynting vector belongs to the seismic wavefield; and
  conducting operation on the second Poynting vector and the first Poynting vector to obtain a final Poynting vector of the seismic wavefield.

Optionally, said adjusting an amplitude of a time derivative of the seismic wavefield, and computing a Poynting vector of the adjusted time derivative of the seismic wavefield to obtain a first Poynting vector specifically includes:
  computing a first-order time derivative of the seismic wavefield;
  computing an amplitude adjustment factor of the first-order time derivative of the seismic wavefield;
  adjusting the amplitude of the first-order time derivative of the seismic wavefield by adopting the amplitude adjustment factor to obtain an adjusted time derivative; and
  computing the Poynting vector of the adjusted time derivative to obtain the first Poynting vector.

Optionally, said conducting operation on the second Poynting vector and the first Poynting vector to obtain a final Poynting vector of the seismic wavefield specifically includes:
  adding the second Poynting vector and the first Poynting vector together to obtain the final Poynting vector.

Optionally, said computing a first-order time derivative of the seismic wavefield specifically includes:
  computing the first-order time derivative of the seismic wavefield by adopting a finite difference method.

Optionally, a computational formula of the amplitude adjustment factor is as follows:

$$a = -\frac{\Delta t}{\sin(2\pi f_d \Delta t)};$$

where $\alpha$ denotes an amplitude adjustment factor; $f_d$ denotes a basic frequency of a seismic wavefield; and $\Delta t$ denotes a time interval of finite difference.

Optionally, a computational formula of the adjusted time derivative is as follows:

$$\overline{u}^t = a\frac{\partial u^t}{\partial t};$$

where $\overline{u}^t$ denotes an adjusted time derivative at moment t; $\alpha$ denotes an amplitude adjustment factor; t denotes time; $u^t$ denotes a seismic wavefield at moment t; and $$\frac{\partial u^t}{\partial t}$$

denotes a first-order time derivative obtained by finding a partial time derivative of $u^t$.

Optionally, a computational formula of the first Poynting vector is as follows:

$$P^{\overline{u}} = -\frac{\partial \overline{u}^t}{\partial t}\nabla \overline{u}^t;$$

where $P^{\overline{u}}$ denotes a first Poynting vector; $\overline{u}^t$ denotes an adjusted time derivative at moment t; t denotes time; and $\nabla \overline{u}^t$ denotes a gradient of $\overline{u}^t$.

Optionally, a computational formula of the first Poynting vector is as follows:

$$P^{\overline{u}} = -\frac{2u^t \sin(\pi f_d \Delta t)}{\Delta t}\nabla \overline{u}^t;$$

where $P^{\overline{u}}$ denotes a first Poynting vector; $\overline{u}^t$ denotes an adjusted time derivative at moment t; t denotes time; $\nabla \overline{u}^t$ denotes the process of finding the gradient of $\overline{u}^t$; $u^t$ denotes a seismic wavefield at moment t; $f_d$ denotes a basic frequency of the seismic wavefield; and $\Delta t$ denotes a time interval of finite difference.

Optionally, a computational formula of the first-order time derivative of the seismic wavefield is as follows:

$$\frac{\partial u^t}{\partial t} = \frac{u^{t+\Delta t} - u^{t-\Delta t}}{2\Delta t};$$

where $u^t$ denotes a seismic wavefield at moment t; t denotes time; $\Delta t$ denotes a time interval of finite difference; $u^{t+\Delta t}$ denotes a seismic wavefield at moment $t+\Delta t$; and $u^{t-\Delta t}$ denotes a seismic wavefield at moment $t-\Delta t$.

The present disclosure further provides a system for stabilizing a Poynting vector of a seismic wavefield, including:

an amplitude adjustment module, which is configured to adjust an amplitude of a time derivative of the seismic wavefield, and compute a Poynting vector of the adjusted time derivative of the seismic wavefield to obtain a first Poynting vector, where a difference between the amplitude of the first Poynting vector and the amplitude of a second Poynting vector is within a set range, and the second Poynting vector belongs to the seismic wavefield; and a Poynting vector operation module, which is configured to conduct operation on the second Poynting vector and the first Poynting vector to obtain a final Poynting vector of the seismic wavefield.

Compared with the prior art, the present disclosure has the following beneficial effects.

The present disclosure provides a method and system for stabilizing a Poynting vector of a seismic wavefield. By means of the method and system, an amplitude of a time derivative of the seismic wavefield is adjusted such that the difference between the amplitude of a Poynting vector of the adjusted time derivative of the seismic wavefield and the amplitude of a Poynting vector of the seismic wavefield is within a set range, and then operation is conducted on the Poynting vector of the adjusted time derivative of the seismic wavefield and the Poynting vector of the seismic wavefield to obtain a final Poynting vector of the seismic wavefield. Given the consistency between the propagation direction represented by the Poynting vector of the seismic wavefield and that represented by the Poynting vector of its time derivative, amplitude adjustment will not change the direction of the Poynting vector. In the meanwhile, as the variations in the amplitude of the Poynting vector of the seismic wavefield and that of the Poynting vector of its time derivative complement each other, that is, the maximum value of one corresponds to the minimum value of the other, the operation between the two can offset the computational instability caused by the minimum value, thereby improving the stability of Poynting vector computation.

BRIEF DESCRIPTION OF THE DRAWINGS

To describe the embodiments of the present disclosure or the technical solutions in the related art more clearly, the accompanying drawings required in the embodiments are briefly introduced below. Obviously, the accompanying drawings described below are only some embodiments of the present disclosure. A person of ordinary skill in the art may further obtain other accompanying drawings based on these accompanying drawings without creative labor.

FIG. 1 is a schematic diagram illustrating time-amplitude of a seismic wavelet and a first-order time derivative thereof;

FIG. 2 is a flowchart of a method for stabilizing a Poynting vector of a seismic wavefield according to an embodiment of the present disclosure;

FIG. 5 is a schematic diagram illustrating Poynting vectors computed by an original Poynting vector equation, a spatial smoothing method, an optical flow method, a time shifting method and the method in the present disclosure for the seismic wavefield as shown in FIG. 4; where FIG. 5(c) is a schematic diagram illustrating an x component of the Poynting vector computed by the smoothing method, FIG. 5(d) is a schematic diagram illustrating a z component of the Poynting vector computed by the smoothing method, FIG. 5(e) is a schematic diagram illustrating an x component of the Poynting vector obtained after conducting iteration five times by the optical flow method, FIG. 5(f) is a schematic diagram illustrating a z component of the Poynting vector obtained after conducting iteration by the optical flow method, FIG. 5(g) is a schematic diagram illustrating an x component of the Poynting vector computed by the time shifting method, FIG. 5(h) is a schematic diagram illustrating a z component of the Poynting vector computed by the time shifting method, FIG. 5(i) is a schematic diagram illustrating an x component of the Poynting vector computed by the method in the present disclosure, and FIG. 5(j) is a schematic diagram illustrating a z component of the Poynting vector computed by the method in the present disclosure;

FIG. 6 is a schematic diagram illustrating the error between a propagation angle computed based on a Poynting vector and an actual propagation angle, where FIG. 6(a) is a schematic diagram illustrating the error between a propagation angle computed based on an original Poynting vector and an actual propagation angle, FIG. 6(b) is a schematic diagram illustrating the error between a propagation angle computed by the smoothing method and an actual propagation angle, FIG. 6(c) is a schematic diagram illustrating the error between a propagation angle computed by the optical flow method and an actual propagation angle, FIG. 6(d) is a schematic diagram illustrating the error between a propagation angle computed by the time shifting method and an actual propagation angle, and FIG. 6(e) is a schematic diagram illustrating the error between a propagation angle computed by the method in the present disclosure and an actual propagation angle;

FIG. 9 is a schematic diagram illustrating a Poynting vector computed by using an original Poynting equation for the seismic wavefield as shown in FIG. 8; where

FIG. 10 is a schematic diagram illustrating a Poynting vector obtained by using the method in the present disclosure for the seismic wavefield as shown in FIG. 8; where

DETAILED DESCRIPTION OF THE EMBODIMENTS

Figure 3:
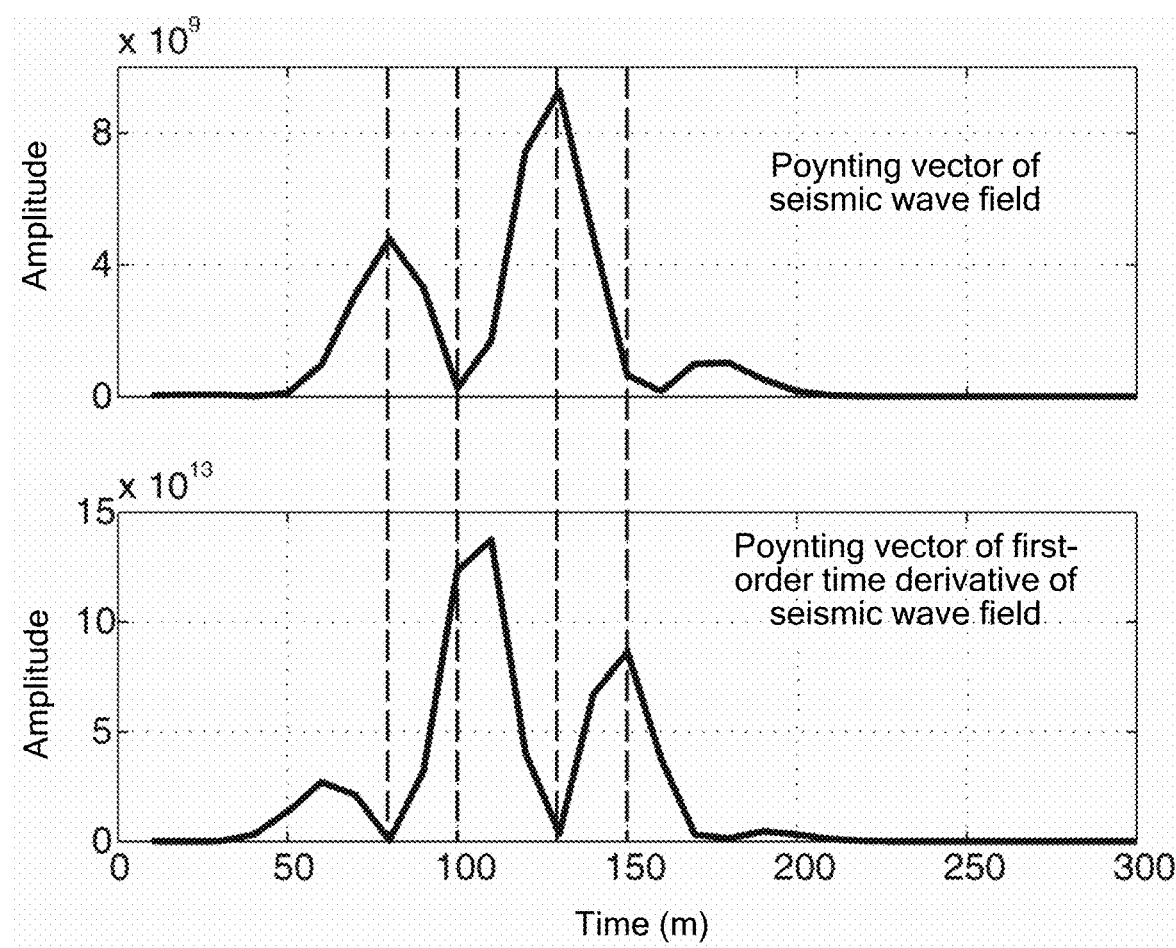
FIG. 3 is a schematic diagram illustrating time-amplitude of a Poynting vector of a seismic wavefield and a Poynting vector of a first-order time derivative of the seismic wavefield according to an embodiment of the present disclosure.

The technical solutions in the embodiments of the present disclosure will be described below clearly and completely with reference to the accompanying drawings in the embodiments of the present disclosure. Apparently, the described embodiments are merely some rather than all of the embodiments of the present disclosure. All other examples obtained by a person of ordinary skill in the art based on the examples of the present disclosure without creative efforts shall fall within the protection scope of the present disclosure.

To make the above-mentioned objective, features, and advantages of the present disclosure clearer and more comprehensible, the present disclosure will be further described in detail below in conjunction with the accompanying drawings and specific embodiments.

Propagation vectors of a seismic wavefield play a very important role in the field of seismic exploration. As a key parameter for generation of angle-domain common-image gathers, propagation vectors are widely used in reverse time migration for suppression of low frequency noise caused by backscattering, illuminance compensation, correction of polarity reversal of converted waves, etc. Propagation vectors can not only be obtained in a spatial-temporal domain, but also be obtained in a frequency-wavenumber domain. Frequency-wavenumber domain methods require a lot of Fourier transform, which leads to low computational efficiency. Since the direction of the Poynting vectors is consistent with that of the propagation vectors, and it only requires the computation of space and time derivatives of a seismic wavefield, Poynting vector computation achieves much higher computational efficiency than that of the frequency-wavenumber domain method, and is thus applied to a wide range of areas. However, Poynting vector computation has the defect of instability.

In order to solve the above problem, embodiments provide a method for stabilizing a Poynting vector of a seismic wavefield. FIG. 2 is a flowchart of a method for stabilizing a Poynting vector of a seismic wavefield according to an embodiment of the present disclosure. Referring to FIG. 2, the method includes the following steps:

Step 101: adjust an amplitude of a time derivative of the seismic wavefield, and compute a Poynting vector of the adjusted time derivative of the seismic wavefield to obtain a first Poynting vector, where the difference between the amplitude of the first Poynting vector and the amplitude of a second Poynting vector is within a set range, and the second Poynting vector belongs to the seismic wavefield.

Step 102: conduct operation on the second Poynting vector and the first Poynting vector to obtain a final Poynting vector of the seismic wavefield.

In an optional implementation, the set range in step 101 can be an order of magnitudes, that is, the amplitude of the time derivative of the seismic wavefield may be adjusted in this implementation, such that the amplitude of the Poynting vector (the first Poynting vector) of the adjusted time derivative of the seismic wavefield is within the same order of magnitudes as that of the second Poynting vector. The purpose of adjusting the two to the same order of magnitudes described herein is to improve computational accuracy.

In an optional implementation, step 101 specifically includes:

1) Compute a first-order time derivative of the seismic wavefield. Specifically, the first-order time derivative of the seismic wavefield may be computed by adopting a finite difference method. A computational formula of the first-order time derivative is as follows:

$$\frac{\partial u^t}{\partial t} = \frac{u^{t+\Delta t} - u^{t-\Delta t}}{2\Delta t};$$

where $$\frac{\partial u^t}{\partial t}$$

denotes a first-order time derivative obtained by finding a partial time derivative of $u^t$; $u^t$ denotes a seismic wavefield at moment t; t denotes time; $\Delta t$ denotes a time interval of finite difference; $u^{t+\Delta t}$ denotes a seismic wavefield at moment $t+\Delta t$ denotes a seismic wavefield at moment $t-\Delta t$.

2) Compute a Poynting vector of the seismic wavefield to obtain a second Poynting vector. A computational formula is specifically as follows:

$$P^u = -\frac{\partial u^t}{\partial t}\nabla u^t;$$

where $P^u$ denotes a second Poynting vector; and $\overline{\nabla u}^t$ denotes a gradient of $u^t$.

3) Compute an amplitude adjustment factor of the first-order time derivative of the seismic wavefield. Specifically, $u^{t+\Delta t}$ and $u^{t-\Delta t}$ may be expressed as:

$$u^{t+\Delta t} = u^t \exp(-i\omega\Delta t);$$

$$u^{t-\Delta t} = u_t \exp(i\omega\Delta t);$$

Temporal difference is expressed as:

$$\frac{u^{t+\Delta t} - u^{t-\Delta t}}{2\Delta t} = \frac{u^t}{2\Delta t}[\exp(-i\omega\Delta t) - \exp(i\omega\Delta t)]$$

$$= \frac{u^t}{2\Delta t}[\cos(\omega\Delta t) - i\sin([\omega\Delta t)] - \frac{u^t}{2\Delta t}[\cos(\omega\Delta t) + i\sin([\omega\Delta t)];$$

$$= -\frac{\sin(\omega\Delta t)}{\Delta t}iu^t$$

$iu^t$ and $u^t$ have the same amplitude, but have a phase difference of 90 degrees therebetween. The advantage of phase difference of 90 degrees is that: the amplitudes of the two Poynting vectors are complementary, with the maximum value of the one corresponding to the minimum value of the other. The above formula is followed by:

$$iu^t = \frac{\Delta t}{\sin(\omega \Delta t)} \frac{u^{t+\Delta t} - u^{t-\Delta t}}{2\Delta t}$$
$$= \frac{\Delta t}{\sin(\omega \Delta t)} \frac{\partial u^t}{\partial t};$$

where $\omega = 2\pi f$, $\omega$ denotes an angular frequency of a seismic wavefield, f denotes a frequency of a seismic wavefield, from which the following can be derived:

$$iu^t = -\frac{\Delta t}{\sin(2\pi f \Delta t)} \frac{\partial u^t}{\partial t};$$

For the sake of simplicity, f is made equivalent to $f_d$, and then $$iu^t = -\frac{\Delta t}{\sin(2\pi f_d \Delta t)} \frac{\partial u^t}{\partial t};$$

a computational formula of the amplitude adjustment factor is as follows:

$$\alpha = -\frac{\Delta t}{\sin(2\pi f_d \Delta t)};$$

where $\alpha$ denotes an amplitude adjustment factor; and $f_d$ denotes a basic frequency of a seismic wavefield.

4) Adjust the amplitude of the first-order time derivative of the seismic wavefield by adopting the amplitude adjustment factor to obtain an adjusted time derivative. Specifically, a computational formula of the adjusted time derivative is as follows:

$$\overline{u}^t = \alpha \frac{\partial u^t}{\partial t};$$

where $\overline{u}^t$ denotes an adjusted time derivative at moment t.

5) Compute the Poynting vector of the adjusted time derivative to obtain the first Poynting vector. The first Poynting vector may be computed using either of the following two methods.

Method I: a computational formula of the first Poynting vector is as follows:

$$P^{\overline{u}} = -\frac{\partial \overline{u}^t}{\partial t} \nabla \overline{u}^t;$$

where $P^{\overline{u}}$ denotes a first Poynting vector; and $\nabla \overline{u}^t$ denotes a gradient of $\overline{u}^t$.

Method II: a computational formula of the first Poynting vector is as follows:

$$P^{\overline{u}} = -\frac{2u^t \sin(\pi f_d \Delta t)}{\Delta t} \nabla \overline{u}^t.$$

Method II has the advantages that in the computational process, the procedure of solving partial time derivatives of $\overline{u}^t$ is omitted, which reduces the amounts of computation, and allows for higher computational efficiency.

In an optional implementation, step 102 specifically includes:

adding the second Poynting vector and the first Poynting vector together to obtain the final Poynting vector. A specific computational formula is as follows:

$$P = P^u + P^{\overline{u}};$$

where P denotes a final Poynting vector.

By means of the method for stabilizing a Poynting vector of a seismic wavefield according to the foregoing embodiment, given the consistency between the direction of a Poynting vector of the seismic wavefield and that of a Poynting vector of its time derivative, although the amplitude of the Poynting vector of the seismic wavefield is much smaller than that of the Poynting vector of its time derivative, the variations in the amplitudes of the two complement each other, that is, as shown in FIG. 3, the minimum value of the Poynting vector of the seismic wavefield corresponds to the maximum value of the Poynting vector of the time derivative. Therefore, the instability in the zero value or minimum value can be avoided by adjusting amplitudes of the two within a set range (e.g., the same order of magnitudes) and then conducting operation (e.g., summation).

For the purpose of illustrating the advantages of the present disclosure, the method in the present disclosure is compared with other methods proposed to solve the instability of Poynting vector computation.

Existing methods for addressing instability of Poynting vector computation are as follows:

(1) Spatial smoothing method. After a Poynting vector is obtained, it is subject to smoothing using Gaussian function.

(2) Multiplex one-dimensional smoothing method. For two-dimensional data and three-dimensional data, Gaussian smoothing function is used directly, which leads to a larger amount of computation. In order to lower the amount of computation, the multiplex one-dimensional smoothing method is adopted. For example, regarding an x component of a Poynting vector, one-dimensional smoothing is first conducted in the x direction, and then conducted in the z direction.

(3) Temporal smoothing method. Firstly, a Poynting vector at each position in space is computed within a period of time, and then subject to temporal smoothing.

(4) Time integration method. Firstly, a Poynting vector at each position in space is computed within a period of time, and then subject to time integration. The integral value is regarded as a Poynting vector at a precomputed position.

(5) Time shifting method. Firstly, a Poynting vector at each position in space is computed within a period of time, and then the maximum value of an absolute value of the Poynting vector within this period of time is searched. The Poynting vector with maximum value is regarded as a Poynting vector at a computed position.

(6) Optical flow method. Developed from computer vision, this method helps to obtain the accurate propagation direction step by step through iteration. An iterative formula of the method is as follows:

$$\begin{cases} p_x^{n+1} = \overline{p}_x^n - \dfrac{\varphi_x(\varphi_x \overline{p}_x^n + \varphi_y \overline{p}_y^n + \varphi_x \overline{p}_y^n + \varphi_t)}{\alpha^2 + |\varphi_x|^2 + |\varphi_y|^2 + |\varphi_x|^2} \\ p_y^{n+1} = \overline{p}_y^n - \dfrac{\varphi_y(\varphi_x \overline{p}_x^n + \varphi_y \overline{p}_y^n + \varphi_x \overline{p}_y^n + \varphi_t)}{\alpha^2 + |\varphi_x|^2 + |\varphi_y|^2 + |\varphi_x|^2} \\ p_z^{n+1} = \overline{p}_z^n - \dfrac{\varphi_z(\varphi_x \overline{p}_x^n + \varphi_y \overline{p}_y^n + \varphi_x \overline{p}_y^n + \varphi_t)}{\alpha^2 + |\varphi_x|^2 + |\varphi_y|^2 + |\varphi_x|^2} \end{cases};$$

where $p_x$, $p_y$ and $p_z$ denote components of a Poynting vector P in three directions of x, y and z under Cartesian coordinates; the superscript n denotes a number of iterations; $\varphi_x = \partial u/\partial x$, $\varphi_y = \partial u/\partial y$, $\varphi_z = \partial u/\partial z$; and $\alpha$ denotes a weighting coefficient.

Among the above methods, Method (1) to Method (4) increase the stability of Poynting vector, but reduce the accuracy of Poynting vector computation at the same time. Method (5) and Method (6), despite their computational accuracy and stability, require a large number of search operations (as required in time shifting method) or iterative operation (as required in optical flow method), which leads to low computational efficiency. By contrast, the method for stabilizing a Poynting vector based on a seismic wavefield and a first-order time derivative thereof according to the present disclosure has high computational efficiency while guaranteeing the computational accuracy and stability.

To further illustrate the advantages of the present disclosure, the following two specific examples are adopted to compare the method proposed in the present disclosure with an existing method.

Figure 4:
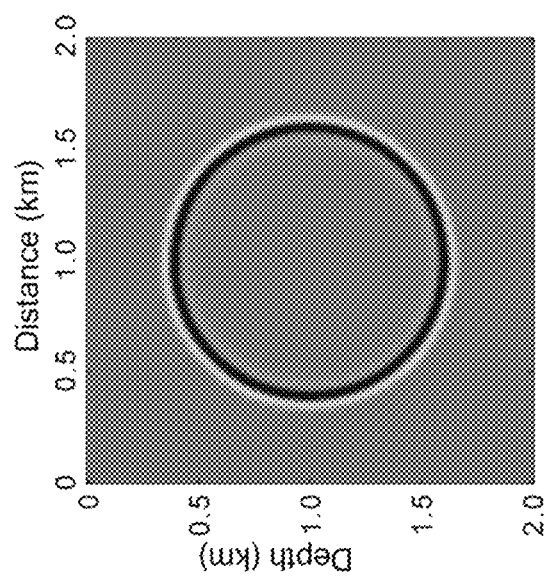
FIG. 4 is a schematic diagram illustrating a seismic wavefield in a homogeneous medium at moment 0.4 s.
Figure 5B:
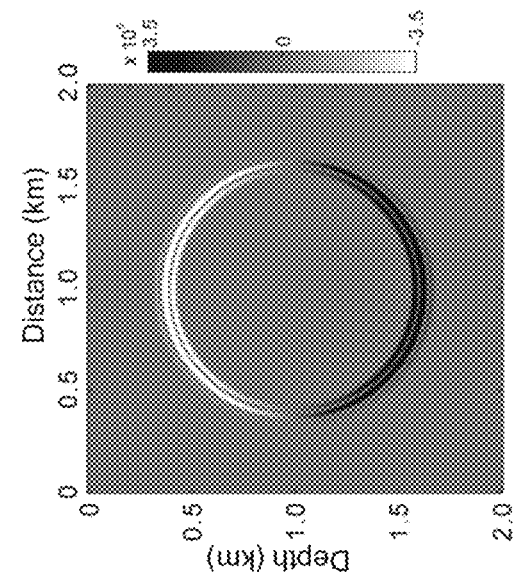
FIG. 5(b) is a schematic diagram illustrating a z component of the Poynting vector obtained by the original Poynting vector computation equation.
Figure 5A:
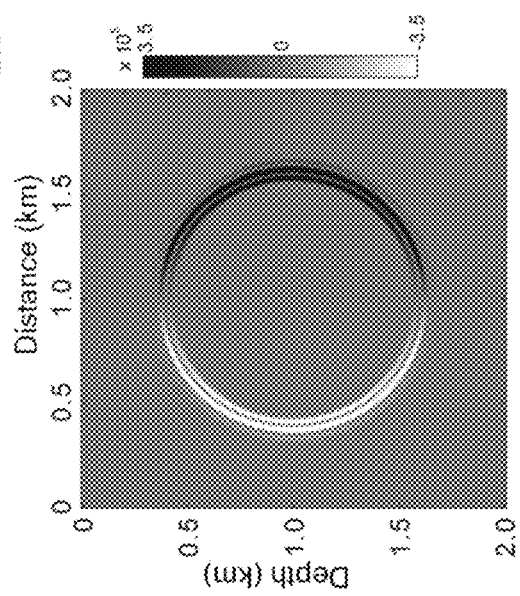
FIG. 5(a) is a schematic diagram illustrating an x component of the Poynting vector obtained by the original Poynting vector computation equation.

In this example, a simple model is adopted. FIG. 4 is a schematic diagram illustrating a seismic wavefield in a homogeneous medium at moment 0.4 s, with a velocity of 2.0 km/s and a basic frequency of 30 Hz. FIG. 5 is a schematic diagram illustrating Poynting vectors computed by an original Poynting vector equation, a spatial smoothing method, an optical flow method, a time shifting method and the method in the present disclosure, the original Poynting vector equation being $$P = -\dfrac{\partial u}{\partial t} \nabla u;$$

where P denotes a Poynting vector, and u denotes a seismic wavefield.

As can be seen from FIG. 4 and FIG. 5, the original Poynting vector has distinct stripes in white bands and black bands, and values on these stripes are close to or equal to zero. A point where the value is equal to zero is regarded an instable point. In other methods, there are no stripes or stripes are less distinct. FIG. 6 shows the error between a propagation angle of seismic wavefield computed by using the Poynting vector shown in FIG. 5 and an actual propagation angle. The point with relatively high amplitude in FIG. 6a is the point where Poynting vector computation is instable. It can be seen from FIG. 6a-FIG. 6e that smoothing method, optical flow method, time shifting method and the method in the present disclosure all improve the stability of Poynting vector computation. Among all the foregoing methods, the method in the present disclosure and the time shifting method produce the smallest error, and achieve the highest computational efficiency.

Compared with the prior art, the present disclosure achieves higher accuracy as well as higher computational efficiency. For the smoothing algorithm, smoothing plays the role of filtering out high frequency and retaining low frequency, which, despite the capacity to avoid points with computational instability, cannot significantly improve the accuracy. Given the consistency between the propagation direction of the Poynting vector of the seismic wavefield and that of the Poynting vector of its first-order time derivative, amplitude adjustment factors will not change the direction of the Poynting vector, which enables the higher computational accuracy of the method described herein. Additionally, as the variations in the amplitude of the Poynting vector of the seismic wavefield and that of the Poynting vector of its first-order time derivative complement each other, that is, the maximum value of one corresponds to the minimum value of the other, the computational instability caused by the minimum value can be offset by adding the two together.

Compared with the time shifting method and the optical flow method, the method in the present disclosure achieves computational accuracy which is similar to that of the time shifting method and higher than that of the optical flow method; besides, as compared with the time shifting method which requires a large number of search operations, and the optical flow method which requires a large number of iterative operations, the method in present disclosure only needs to compute the Poynting vector for one more time, thus enabling high computational efficiency.

Figure 7:
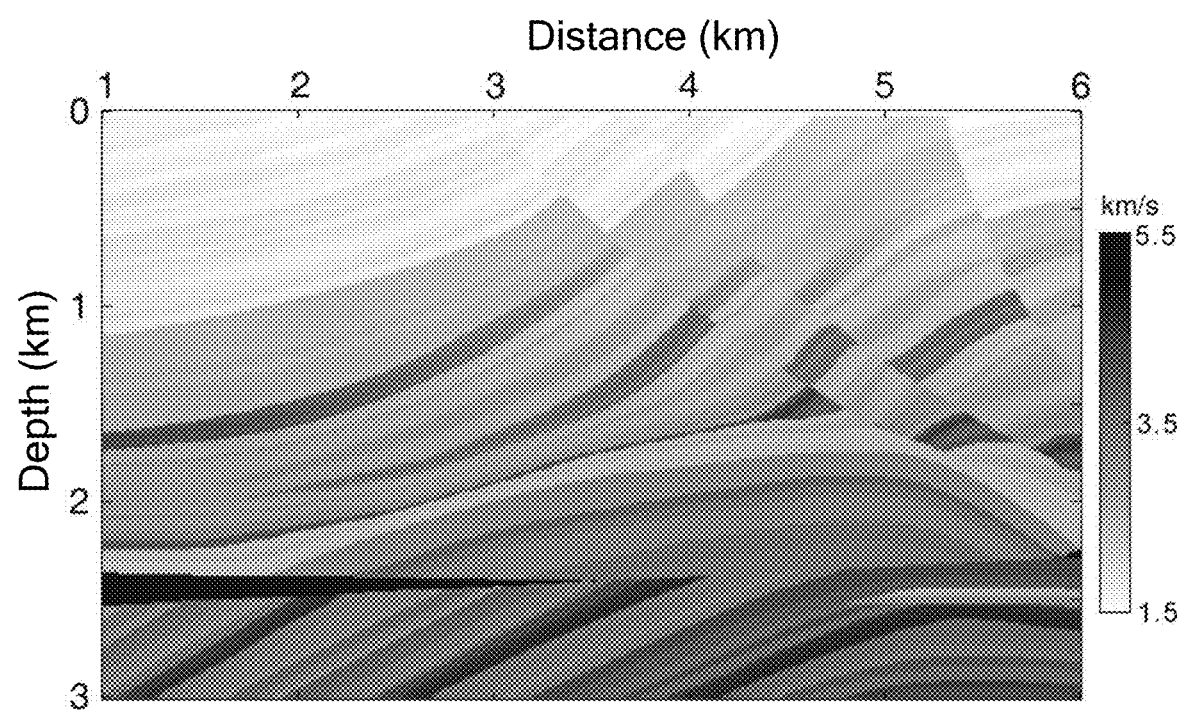
FIG. 7 is a schematic diagram of a Marmousi model.
Figure 8:
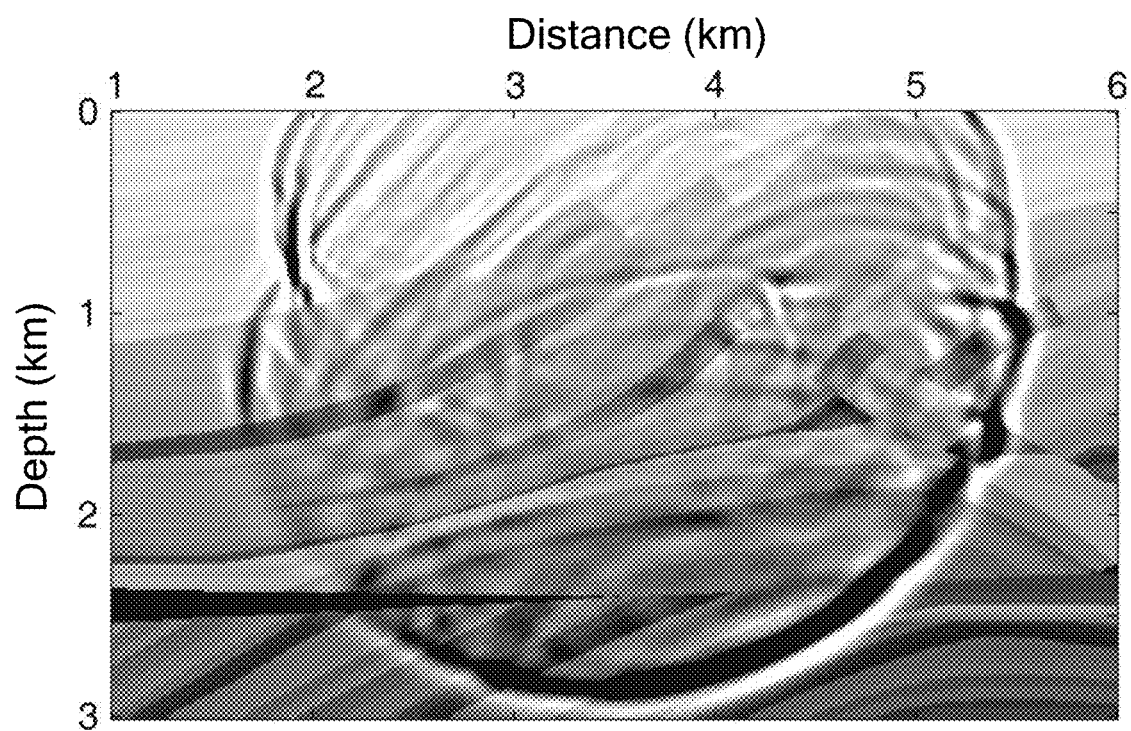
FIG. 8 is a schematic diagram illustrating a seismic wavefield of a Marmousi model at moment 1.0 s.
Figure 9A:
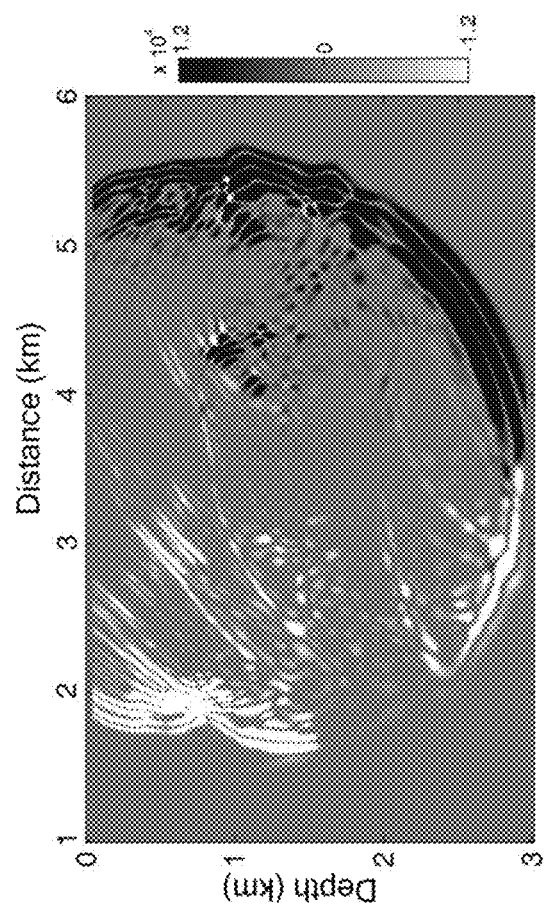
FIG. 9(a) is a schematic diagram illustrating an x component of a Poynting vector computed by using an original Poynting equation for the seismic wavefield as shown in FIG. 8.
Figure 9B:
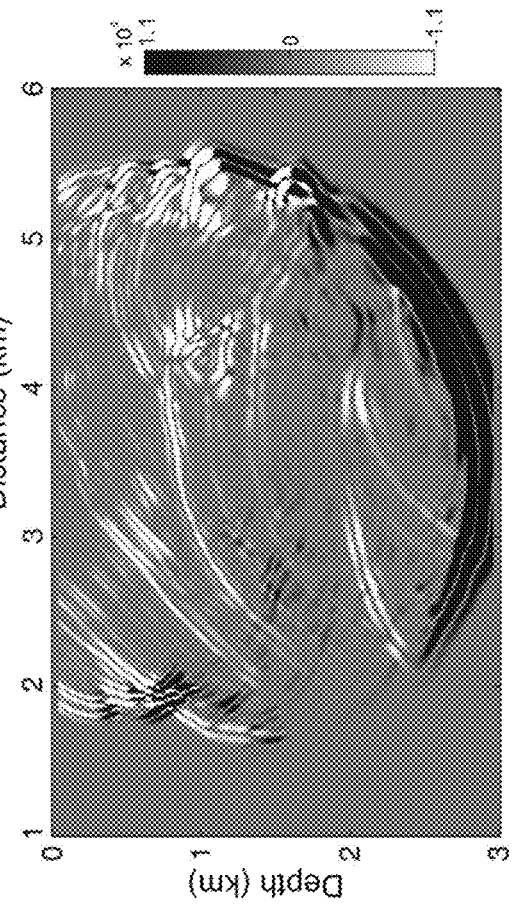
FIG. 9(b) is a schematic diagram illustrating a z component of a Poynting vector computed by using an original Poynting equation for the seismic wavefield as shown in FIG. 8.
Figure 10A:
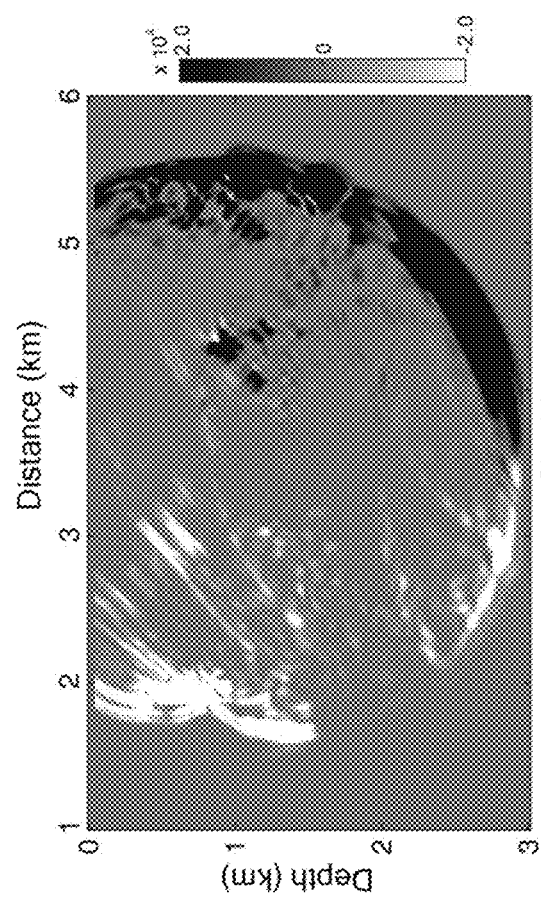
FIG. 10(a) is a schematic diagram illustrating an x component of a Poynting vector obtained by using the method in the present disclosure for the seismic wavefield as shown in FIG. 8.
Figure 10B:
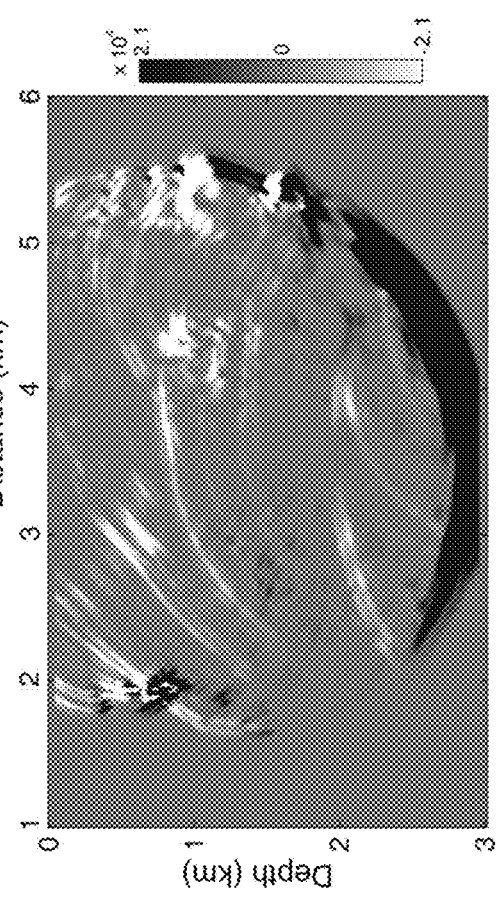
FIG. 10(b) is a schematic diagram illustrating a z component of a Poynting vector obtained by using the method in the present disclosure for the seismic wavefield as shown in FIG. 8.

In this example, a complex model is adopted. FIG. 7 shows a Marmousi model, FIG. 8 shows a seismic wavefield at moment 1.0 s, FIG. 9 shows a Poynting vector computed by using an original Poynting vector equation, and FIG. 10 shows a Poynting vector computed by the method in the present disclosure. Comparison between FIG. 10 and FIG. 9 shows that the stripes in the black and white bands in FIG. 9 are very distinct and there are many instable points, while the stripes in FIG. 10 are less distinct and the stability has been greatly improved.

Poynting vector obtained by using the method in the present disclosure plays a very important role in seismic exploration, and can be applied to a variety of scenarios. For example, Poynting vector can be widely used in reverse time migration for suppression of low frequency noise caused by backscattering, illuminance compensation, correction of polarity reversal of converted waves, etc.

The low frequency noise caused by backscattering is suppressed in reverse time migration, and a Poynting vector $P_{src}$ of a seismic source wave field and a Poynting vector $P_{rec}$ of a rectification point wave field are solved respectively by using the method provided in this embodiment, where subscript src denotes the source wave field, rec denotes the rectification point wave field, and the reflection angle is obtained by using the following formula:

$$\theta = 0.5 \times \arccos\left(\dfrac{P_{src} \cdot P_{rec}}{\|P_{src}\| \|P_{rec}\|}\right);$$

Low frequency noise can then be suppressed by using imaging in the following formula:

$$I(x) = \int_0^{T_{max}} \cos^n\theta \cdot u_{src}(x,t) u_{rec}(x,t) dt;$$

where I denotes an imaging profile under reverse time migration, x denotes a spatial position, $T_{max}$ denotes a maximum imaging time, n is a positive integer greater than 1, which generally delivers a better effect when set to be greater than or equal to 3.

Figure 11:
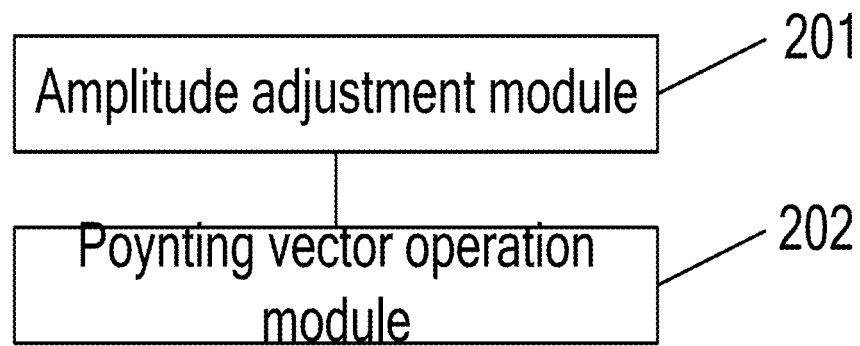
FIG. 11 is a structure diagram of a system for stabilizing a Poynting vector of a seismic wavefield according to an embodiment of the present disclosure.

The present disclosure further provides a system for stabilizing a Poynting vector of a seismic wavefield. FIG. 11 is a structure diagram of a system for stabilizing a Poynting vector of a seismic wavefield according to an embodiment of the present disclosure. Referring to FIG. 11, the system includes:

an amplitude adjustment module 201, which is configured an amplitude of a time derivative of the seismic wavefield, and compute a Poynting vector of the adjusted time derivative of the seismic wavefield to obtain a first Poynting vector, where a difference between the amplitude of the first Poynting vector and the amplitude of a second Poynting vector is within a set range, and the second Poynting vector belongs to the seismic wavefield; and a Poynting vector operation module 202, which is configured to conduct operation on the second Poynting vector and the first Poynting vector to obtain a final Poynting vector of the seismic wavefield.

By means of the system for stabilizing a Poynting vector of a seismic wavefield according to an embodiment of the present disclosure, given the consistency between the direction of a Poynting vector of the seismic wavefield and that of a Poynting vector of its time derivative, although the amplitude of the Poynting vector of the seismic wavefield is much smaller than that of the Poynting vector of its time derivative, the variations in the amplitudes of the two complement each other, that is, the minimum value of the Poynting vector of the seismic wavefield corresponds to the maximum value of the Poynting vector of the time derivative. Therefore, the instability in the zero value or minimum value can be avoided by adjusting amplitudes of the two within a set range and then conducting operation.

Each example of the present specification is described in a progressive manner, each example focuses on the difference from other examples, and the same and similar parts between the examples may refer to each other. Since the system disclosed in an embodiment corresponds to the method disclosed in another embodiment, the description is relatively simple, and reference can be made to the method description.

Specific examples are used herein to explain the principles and embodiments of the present disclosure. The foregoing description of the embodiments is merely intended to help understand the method of the present disclosure and its core ideas; besides, various modifications may be made by a person of ordinary skill in the art to specific embodiments and the scope of application in accordance with the ideas of the present disclosure. In conclusion, the content of the present description shall not be construed as limitations to the present disclosure.

What is claimed is:

1. A method for stabilizing a Poynting vector of a seismic wavefield, comprising:
   establishing a Poynting vector stabilization module contained in a seismic imaging device further provided with one or more processors and a known seismic imaging software, wherein the Poynting vector stabilization module is configured for:
   adjusting an amplitude of a time derivative of the seismic wavefield, and computing a Poynting vector of the adjusted time derivative of the seismic wavefield to obtain a first Poynting vector, wherein a difference between the amplitude of the first Poynting vector and the amplitude of a second Poynting vector is within a set range, and the second Poynting vector is a Poynting vector of the seismic wavefield; and
   conducting an operation on the second Poynting vector and the first Poynting vector to obtain a final Poynting vector of the seismic wavefield;
   wherein adjusting the amplitude of the time derivative of the seismic wavefield, and computing the Poynting vector of the adjusted time derivative of the seismic wavefield to obtain the first Poynting vector comprises:
   computing a first-order time derivative of the seismic wavefield;
   computing an amplitude adjustment factor of the first-order time derivative of the seismic wavefield;
   adjusting the amplitude of the first-order time derivative of the seismic wavefield by adopting the amplitude adjustment factor to obtain an adjusted time derivative; and
   computing the Poynting vector of the adjusted time derivative to obtain the first Poynting vector;
   collecting and inputting a seismic wavefield at a target seismic source and a seismic wavefield at a target geophone into the Poynting vector stabilization module to obtain a final Poynting vector of the seismic wavefield at the target seismic source and a final Poynting vector of the seismic wavefield at the target geophone;
   calculating, by the seismic imaging device, an imaging profile under reverse time migration based on the final Poynting vector of the seismic wavefield at the target seismic source and the final Poynting vector of the seismic wavefield at the target geophone according to following expression:

$$I(x)=\int_0^{T_{max}} \cos^n\theta \cdot u_{src}(x,t)u_{rec}(x,t)dt;$$

where I is the imaging profile under reverse time migration; x denotes a spatial position; $T_{max}$ denotes a maximum imaging time; n is a predetermined positive integer greater than 1; $u_{src}(x, t)$ is a seismic source wavefield at spatial position x at time t; $u_{rec}(x, t)$ is a seismic wavefield at spatial position x at time t; $\theta$ denotes a reflection angle and is expressed as:

$$\theta=0.5\times\arccos(P_{src}\cdot P_{rec}/\|P_{src}\|\|P_{rec}\|)$$

where $P_{src}$ is the final Poynting vector of the seismic wavefield at the seismic source; $P_{rec}$ is the final Poynting vector of the seismic wavefield at the target geophone; and
visually outputting, by the known seismic imaging software, the imaging profile under reverse time migration.

2. The method for stabilizing a Poynting vector of a seismic wavefield according to claim 1, wherein said conducting an operation on the second Poynting vector and the first Poynting vector to obtain the final Poynting vector of the seismic wavefield specifically comprises:
   adding the second Poynting vector and the first Poynting vector together to obtain the final Poynting vector.

3. The method for stabilizing a Poynting vector of a seismic wavefield according to claim 2, wherein a computational formula of the amplitude adjustment factor is as follows:

$$a = -\frac{\Delta t}{\sin(2\pi f_d \Delta t)};$$

wherein a denotes an amplitude adjustment factor; $f_d$ denotes a basic frequency of a seismic wavefield; and $\Delta t$ denotes a time interval of finite difference.

4. The method for stabilizing a Poynting vector of a seismic wavefield according to claim 2, wherein a computational formula of the first-order time derivative is as follows:

$$\frac{\partial u^t}{\partial t} = \frac{u^{t+\Delta t} - u^{t-\Delta t}}{2\Delta t};$$

wherein $u^t$ denotes a seismic wavefield at moment t; t denotes time; $\Delta t$ denotes a time interval of finite difference; $u^{t+\Delta t}$ denotes a seismic wavefield at moment t+$\Delta t$; and $u^{t-\Delta t}$ denotes a seismic wavefield at moment t−$\Delta t$.

5. The method for stabilizing a Poynting vector of a seismic wavefield according to claim 1, wherein said computing the first-order time derivative of the seismic wavefield specifically comprises:
computing the first-order time derivative of the seismic wavefield by adopting a finite difference method.

6. The method for stabilizing a Poynting vector of a seismic wavefield according to claim 1, wherein a computational formula of the adjusted time derivative is as follows:

$$\bar{u}^t = a\frac{\partial u^t}{\partial t};$$

wherein $\bar{u}^t$ denotes an adjusted time derivative at moment t; a denotes an amplitude adjustment factor; t denotes time; $u^t$ denotes a seismic wavefield at moment t; and $$\frac{\partial u^t}{\partial t}$$

denotes a first-order time derivative obtained by finding a partial time derivative of $u^t$.

7. The method for stabilizing a Poynting vector of a seismic wavefield according to claim 1, wherein a computational formula of the first Poynting vector is as follows:

$$P^{\bar{u}} = -\frac{\partial \bar{u}^t}{\partial t}\nabla\bar{u}^t;$$

wherein $P^{\bar{u}}$ denotes a first Poynting vector; $\bar{u}^t$ denotes an adjusted time derivative at moment t; t denotes time; and $\nabla \bar{u}^t$ denotes a gradient of $\bar{u}^t$.

8. The method for stabilizing a Poynting vector of a seismic wavefield according to claim 1, wherein a computational formula of the first Poynting vector is as follows:

$$P^{\bar{u}} = -\frac{2u^t \sin(\pi f_d \Delta t)}{\Delta t}\nabla\bar{u}^t;$$

wherein $P^{\bar{u}}$ denotes a first Poynting vector; $\bar{u}^t$ denotes an adjusted time derivative at moment t; t denotes time; $\nabla\bar{u}^t$ denotes the process of finding the gradient of $\bar{u}^t$; $u^t$ denotes a seismic wavefield at moment t; $f_d$ denotes a basic frequency of the seismic wavefield; and $\Delta t$ denotes a time interval of finite difference.

9. A system for stabilizing a Poynting vector of a seismic wavefield, comprising:
a processor; and
a memory having program codes comprising a Poynting vector stabilization module and a known seismic imaging software, stored thereon, wherein the Poynting vector stabilization module is configured to:
adjust an amplitude of a time derivative of the seismic wavefield, and compute a Poynting vector of the adjusted time derivative of the seismic wavefield to obtain a first Poynting vector, wherein a difference between the amplitude of the first Poynting vector and the amplitude of a second Poynting vector is within a set range, and the second Poynting vector is a Poynting vector of the seismic wavefield; and
conduct an operation on the second Poynting vector and the first Poynting vector to obtain a final Poynting vector of the seismic wavefield;
wherein the processor is configured to execute program codes to adjust the amplitude of the time derivative of the seismic wavefield, compute the Poynting vector of the adjusted time derivative of the seismic wavefield to obtain the first Poynting vector configured to be generated by:
computing a first-order time derivative of the seismic wavefield;
computing an amplitude adjustment factor of the first-order time derivative of the seismic wavefield;
adjusting the amplitude of the first-order time derivative of the seismic wavefield by adopting the amplitude adjustment factor to obtain an adjusted time derivative; and
computing the Poynting vector of the adjusted time derivative to obtain the first Poynting vector, wherein the program codes, when executed by the processor, cause the processor to:
collect and input a seismic wavefield at a target seismic source and a seismic wavefield at a target geophone into the Poynting vector stabilization device to obtain a final Poynting vector of the seismic wavefield at the target seismic source and a final Poynting vector of the seismic wavefield at the target geophone;
calculate, by the seismic imaging device, an imaging profile under reverse time migration based on the final Poynting vector of the seismic wavefield at the target seismic source and the final Poynting vector of the seismic wavefield at the target geophone according to following expression:

$I(x) = \int_0^{T_{max}} \cos^n\theta \cdot u_{src}(x,t) u_{rec}(x,t) dt$ where I is the imaging profile under reverse time migration; x denotes a spatial position; $T_{max}$ denotes a maximum imaging time; n is a predetermined positive integer greater than 1; $u_{src}(x, t)$ is the seismic source wavefield at spatial position x at time t; $u_{rec}(x, t)$ is the seismic-wavefield at spatial position x at time t; $\theta$ denotes a reflection angle and is expressed as:

$\theta = 0.5 \times \arccos(P_{src} \cdot P_{rec}/\|P_{src}\|\|P_{rec}\|)$ where $P_{src}$ is the final Poynting vector of the seismic wavefield at the seismic source; $P_{rec}$ is the final Poynting vector of the seismic wavefield at the target geophone; and
visually output, by the known seismic imaging software, the imaging profile under reverse time migration.

* * * * *